（12） United States Patent
Xie et al.

(10) Patent No.: US 8,994,447 B2
(45) Date of Patent: Mar. 31, 2015

(54) VOLTAGE REGULATION METHOD AND CORRESPONDING HPM, CHIP, AND CHIP SYSTEM

(71) Applicant: Huawei Technologies Co., Ltd., Shenzhen, Guangdong (CN)

(72) Inventors: Qian Xie, Shanghai (CN); Xinru Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/337,948

(22) Filed: Jul. 22, 2014

(65) Prior Publication Data

US 2015/0028931 A1     Jan. 29, 2015

(30) Foreign Application Priority Data

Jul. 24, 2013  (CN) .......................... 2013 1 0314426

(51) Int. Cl.
*G05F 1/10*  (2006.01)
*G01R 19/00*  (2006.01)
*G01R 31/28*  (2006.01)

(52) U.S. Cl.
CPC .............. *G05F 1/10* (2013.01); *G01R 19/0084* (2013.01); *G01R 31/28* (2013.01)

USPC ........................... 327/540; 327/306; 327/544

(58) Field of Classification Search
USPC .......... 327/306, 512, 513, 530, 538, 540, 544
See application file for complete search history.

(56) References Cited

U.S. PATENT DOCUMENTS

| 7,061,292 | B2 * | 6/2006 | Maksimovic et al. ........ 327/277 |
| 8,004,329 | B1 * | 8/2011 | Liu et al. ....................... 327/161 |
| 8,531,225 | B1 * | 9/2013 | Hussain ......................... 327/276 |
| 8,797,095 | B2 * | 8/2014 | Moore et al. .................. 327/544 |
| 2010/0289553 | A1 * | 11/2010 | Wang ............................ 327/512 |

\* cited by examiner

*Primary Examiner* — William Hernandez

(57) ABSTRACT

The application discloses a voltage regulation method, and a corresponding HPM, chip, and chip system. The method is used to regulate a working voltage of the chip, which includes an AVS module and at least one HPM. The method includes: outputting, by the AVS module, a clock signal to the HPM; generating, by the HPM, a corresponding pulse signal according to the clock signal and at least performing first delaying for the pulse signal to acquire a first actual output value and performing second delaying for the pulse signal to acquire a second actual output value; and fitting, by the AVS module, the first and second actual output values at least according to weights of the first and second actual output values to acquire a fitting output value and determine, by comparing the fitting output value with a predetermined reference value, whether to regulate the working voltage of the chip.

17 Claims, 6 Drawing Sheets

VOLTAGE REGULATION METHOD AND CORRESPONDING HPM, CHIP, AND CHIP SYSTEM

CROSS-REFERENCE TO RELATED APPLICATIONS

This application claims priority to Chinese Patent Application No. 201310314426.X, filed on Jul. 24, 2013, which is hereby incorporated by reference in its entirety.

TECHNICAL FIELD

The present application relates to the field of integrated circuit technologies, and in particular, to a voltage regulation method and a corresponding HPM, chip, and chip system.

BACKGROUND

In this era where energy-saving is high promoted, how to reduce power consumption of a chip has been a very concern currently. As is known to all, the power consumption of the chip is related to a working voltage. The higher the working voltage is, the greater the power consumption becomes. A minimum working voltage needed for the chip is dependent on critical paths in the chip, and the minimum working voltage needed for the chip changes with factors like temperature of the critical paths. When the chip works with a fixed working voltage, and yet the minimum working voltage needed for the chip is relatively low, unnecessary power consumption may be caused.

To keep the power consumption of the chip as low as possible, an adaptive voltage scaling (Adaptive Voltage Scaling, AVS for short) method is provided according to the prior art. Referring to FIG. 1, the chip 110 includes an adaptive voltage scaling AVS module 111 and a plurality of hardware performance monitors (Hardware Performance Monitor, HPM for short) 112 that are set in the vicinity of all critical paths respectively. The HPM 112 reflects in real time how corresponding critical paths in the chip 110 change with techniques, voltage, and temperature (PVT for short). The AVS module 111 acquires a current output value of the HPM 112 and compares the output value of the current HPM 112 with a reference value that is obtained through a test performed by an Automatic Test Equipment (Automatic Test Equipment, ATE for short). The reference value is an output value of the hardware performance monitor when the chip works with the minimum working voltage at any temperature. When the output value of the HPM 112 is smaller than a reference value, it indicates that a current working voltage of the chip 110 is too low, and therefore the AVS module 111 increases an output working voltage Vdd to the chip 110 by controlling an external power chip 120 by using a voltage interface 130. Otherwise, when the output value of the HPM 112 is bigger than or equal to the reference value, it indicates that the current voltage of the chip is too high, and therefore the AVS module 111 decreases the output working voltage Vdd to the chip 110 by controlling the external power chip 120 by using the voltage interface 130.

Referring to FIG. 2, the existing HPM 112 includes a generating module 1122 and a delay circuit 1121. Generally, the delay circuit 1121 includes a plurality of delay units 11211. When the AVS module 111 sends a clock signal to the HPM 112, the generating module 1122 of the HPM 112 inputs a corresponding pulse signal to the delay circuit 1121, and the delay circuit 1121 performs a delay on the input signal to generate an output value and sends the output value to the AVS module. To ensure that the output value of the HPM can correctly reflect how the corresponding critical paths in the chip 110 change with PVT, a Vt type of the delay unit 11211 of the delay circuit 1121 must be the same as the Vt type of the critical paths in the chip 110. For example, referring to FIG. 3, FIG. 3 shows minimum working voltages that different Vt types require at different temperatures. If the Vt type of the HPM 112, that is, the Vt type of the delay unit 11211 is UHVT, and the Vt type of the critical paths in the chip 110 is LVT, it may be easily known from FIG. 3 that in a state of −40° C., chip performance reflected by the HPM 112 is as follows: the minimum working voltage that the chip requires is 0.82 Volt (V) while the critical paths in the chip 110 only require 0.78 V. In this case, a waste of the power consumption is caused to the chip.

However, in the chip according to the prior art, a Multi-Threshold (Multi-Vt) technology is generally adopted to reduce the power consumption. Therefore, there can be different Vt types that correspond to different critical paths in the chip, and how to choose the Vt type of the delay unit in the HPM is a difficult problem. For example, standard cells of an SVT+HVT+UHVT type are adopted in a chip, and then a Vt type of different critical paths in the chip may be an SVT, HVT, or UHVT type. In this case, no matter which type of delay unit is selected for the HPM, performance of all critical paths in the chip cannot be accurately reflected. For example, as shown in FIG. 3, if a delay unit of the SVT type is selected for the HPM, at −40° C., chip performance reflected by the HPM is as follows: The working voltage that the chip requires is 0.79 V while the critical paths of UHVT type in the chip actually requires 0.82 V. If a delay unit of UHVT type is adopted the HPM, at −40° C., the chip performance reflected by the HPM is as follows: the working voltage that the chip requires is 0.82 V whereas the critical paths of UHVT type in the chip actually require 0.81 V.

In conclusion, based on the prior art, the HPM is simply not capable of correctly reflecting how all critical paths in a multi-Vt chip system change with PVT. Therefore, the AVS module fails to ensure reduction of the power consumption of the chip when the chip works normally at the same time.

SUMMARY

A major technical problem mainly solved in this application is how to provide a voltage regulation method and a corresponding HPM, chip, and chip system, enabling the chip to effectively reduce power consumption of the chip on a premise that the chip works properly.

To resolve the foregoing technical problem, a first aspect of the present application provides a voltage regulation method, which is used to regulate a working voltage of a chip, including an adaptive voltage scaling AVS module and at least one hardware performance monitor HPM. The method includes: outputting, by the AVS module, a clock signal to the HPM; generating, by the HPM, a corresponding pulse signal according to the clock signal, and at least performing, for the pulse signal, first delaying related to a first threshold voltage Vt type that is in the chip and changes fastest with temperature, to acquire a first actual output value that can reflect current performance information of the first Vt type and performing, for the pulse signal, second delaying related to a second Vt type that is in the chip and changes slowest with the temperature, to acquire a second actual output value that can reflect current performance information of the second Vt type, and outputting the first and second output values to the AVS module; and fitting, by the AVS module, the first and second actual output values at least according to weights of the first and second actual output values, and acquiring a fitting output value that can reflect current current performance information of critical paths in the chip, and determining whether to regulate the working voltage of the chip by comparing the fitting output value with a predetermined reference value, where the predetermined reference value is a fitting output value of the HPM when the chip works with a minimum working voltage at any temperature.

With reference to the first aspect, in a first possible implementation manner of the first aspect, the fitting, by the AVS module, the first and second actual output values at least according to weights of the first and second actual output values, and acquiring a fitting output value that can reflect current performance information of critical paths in the chip includes: calculating, by the AVS module, a first product acquired by multiplying the first actual output value of the HPM by a predetermined first weight, and calculating a second product acquired by multiplying the second actual output value of the HPM by a predetermined second weight, to acquire a sum of the first product and the second product and use the sum as the fitting output value of the HPM.

With reference to the first possible implementation manner of the first aspect, in a second possible implementation manner of the first aspect, before the outputting, by the AVS module, a clock signal to the HPM, the method includes: acquiring the minimum working voltage of the chip at different temperatures, and the first and second actual output values of the HPM when the chip works with different working voltages at the different temperatures; and adopting the least square method to perform calculation on the minimum working voltage of the chip at the different temperatures and the first and second actual output values of the HPM when the chip works with the different working voltages at the different temperatures, to acquire the predetermined first weight and the predetermined second weight.

With reference to the first aspect, in a third possible implementation manner of the first aspect, the determining whether to regulate the working voltage of the chip by comparing the fitting output value with a predetermined reference value includes: determining, by the AVS module, whether a difference acquired by subtracting the predetermined reference value from the fitting output value is larger than zero or smaller than zero; if the difference is larger than zero, determining that a current working voltage of the chip is higher than the minimum working voltage required at the moment and decreasing the working voltage of the chip; and if the difference is smaller than zero, determining that the current working voltage of the chip is lower than the minimum working voltage required at the moment and increasing the working voltage of the chip.

To resolve the foregoing technical problem, a second aspect of the present application provides a hardware performance monitor, at least including a first delay circuit and a second delay circuit, where the first delay circuit includes at least one first delay unit of a first threshold voltage Vt type and a first encoding unit, where an output terminal and an input terminal of the at least one first delay unit are head-to-tail connected to form a loop, and the first encoding unit performs encoding according to an output value of the at least one first delay unit, to acquire a first actual output value that can reflect a delay situation of the at least one first delay unit and further reflecting current performance information of the first Vt type; and the second delay circuit includes at least one second delay unit of a second Vt type and a second encoding unit, where an output terminal and an input terminal of the at least one second delay unit are head-to-tail connected to form a loop, and the second encoding unit performs encoding according to an output value of the at least one second delay unit, to acquire a second actual output value that can reflect a delay situation of the at least one second delay unit and further reflecting current performance information of the second Vt type, where the first Vt type and the second Vt type are Vt types that change at different speeds with temperature.

To resolve the foregoing technical problem, a third aspect of the present application provides a chip, including: an adaptive voltage scaling AVS module and at least one hardware performance monitor HPM; where: the AVS module is coupled to the at least one HPM, where the AVS module includes an outputting unit, a fitting unit, and a regulating unit, and the outputting unit is configured to output a clock signal to the HPM; the HPM at least includes: a generating module, a first delay circuit, and a second delay circuit, where the generating module is configured to generate a corresponding pulse signal according to the clock signal, the first delay circuit is configured to perform, for the pulse signal, first delaying related to a first threshold voltage Vt type that is in the chip and changes fastest with temperature, to acquire a first actual output value that can reflect current performance information of the first Vt type, and the second delay circuit is configured to perform signal second delaying related to a second Vt type that is in the chip and changes slowest with temperature for the pulse, to acquire a second actual output value that can reflect current performance information of the second Vt type; the HPM outputs the first and second actual output values to the fitting unit of the AVS module; the fitting unit of the AVS module is configured to fit the first and second actual output values at least according to weights of the first and second actual output values to acquire a fitting output value that can reflect current performance information of critical paths in the chip; and the regulating unit is configured to determine, by comparing the fitting output value with a predetermined reference value, whether to regulate a working voltage of the chip, where the predetermined reference value is a fitting output value of the HPM when the chip works with a minimum working voltage at any temperature.

With reference to the third aspect, in a first possible implementation manner of the third aspect, the fitting unit is specifically configured to calculate a first product acquired by multiplying the first actual output value of the HPM by a predetermined first weight and calculate a second product acquired by multiplying the second actual output value of the HPM by a predetermined second weight, to acquire a sum of the first product and the second product and use the sum as the fitting output value of the HPM.

With reference to the first possible implementation manner of the third aspect, in a second possible implementation manner of the third aspect, the predetermined first weight and the predetermined second weight are acquired specifically by firstly acquiring the minimum working voltage of the chip at different temperatures and the first and second actual output values of the HPM when the chip works with different working voltages at different temperatures, and then adopting the least square method to perform calculation on the minimum working voltage of the chip at the different temperatures and the first and second actual output values of the HPM when the chip works with the different working voltages at the different temperatures.

With reference to the third aspect, in a third possible implementation manner of the third aspect, the regulating unit is specifically configured to: determine whether a difference acquired by subtracting the predetermined reference value from the fitting output value is larger than zero or smaller than zero; if the difference is larger than zero, determine that a current working voltage of the chip is higher than the minimum working voltage required at the moment and decrease the working voltage of the chip; and if the difference is smaller than zero, determine that the current working voltage of the chip is lower than the minimum working voltage required at the moment and increase the working voltage of the chip.

With reference to the third aspect, in a fourth possible implementation manner of the third aspect, the first delay circuit includes at least one first delay unit of the first Vt type and a first encoding unit, where an output terminal and an input terminal of the at least one first delay unit are head-to-tail connected to form a loop, and the first encoding unit performs encoding according to an output value of the at least one first delay unit, to acquire a first actual output value that can reflect a delay situation of the first delay unit and further reflect current performance information of the first Vt type; and the second delay circuit includes at least one second delay unit of the Vt type and a second encoding unit, where an output terminal and an input terminal of the at least one second delay unit are head-to-tail connected to form a loop, and the second encoding unit performs encoding according to an output value of the at least one second delay unit, to acquire a second actual output value that can reflect a delay situation of the second delay unit and further reflect current performance information of the second Vt type.

With reference to the fourth possible implementation manner of the third aspect, in a fifth possible implementation manner of the third aspect, the HPM further includes a third delay circuit, where the third delay circuit includes at least one third delay unit of a third Vt type and a third encoding unit, where an output terminal and an input terminal of the at least one third delay unit are head-to-tail connected to form a loop, and the third encoding unit performs encoding according to an output value of the at least one third delay unit, to acquire a third actual output value that can reflect a delay situation of the third delay unit and further reflecting current performance information of the third Vt type, where the third Vt type is a Vt type that is in the chip and changes between fastest and lowest with temperature; and the fitting unit of the AVS module is specifically configured to fit the first, second, and third actual output values according to weights of the first, second, and third actual output values to acquire a fitting output value that can reflect current performance information of the critical path of the chip.

To resolve the foregoing technical problem, a fourth aspect of the present application provides a chip system, and the chip system includes the chip and the power chip that are described above, where the power chip is configured to supply power for the chip; when it is determined that a working voltage of the chip needs to be increased, an AVS module of the chip instructs the power chip to input to the chip a working voltage that is a predetermined value higher than an original working voltage; and when it is determined that the working voltage of the chip needs to be decreased, the AVS module of the chip instructs the power chip to input to the chip a working voltage that is a predetermined value lower than the original working voltage.

A beneficial effect of the present application is that distinguished from a situation in the prior art, the present application sets at least two types of delay circuits in an HPM, and for the two types of the delay circuits, a delay unit of a Vt type that changes fastest with temperature and a delay unit of a Vt type that changes slowest with the temperature are respectively adopted, to fit an actual output value of the HPM and acquire a fitting output value of the HPM that can accurately reflect current performance information of critical paths in a chip and further properly regulate a working voltage of the chip, thereby effectively reducing power consumption of the chip on a premise that the chip works normally.

DESCRIPTION OF EMBODIMENTS

The following descriptions are made with reference to the accompanying drawings and specific implementations.

Figure 4:
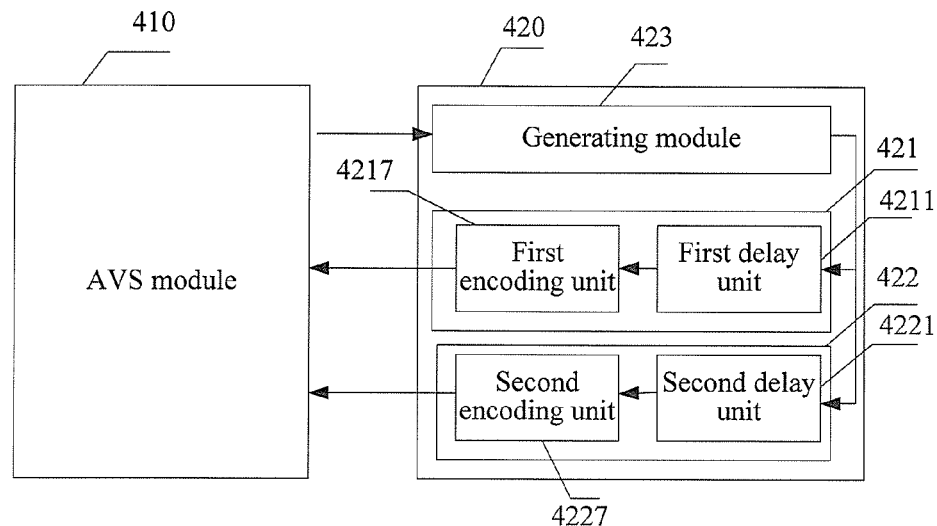
FIG. 4 is a schematic structural diagram of a chip according to an embodiment of the present application.

FIG. 4 is a schematic structural diagram of a chip according to an embodiment of the present application. Referring to FIG. 4, the chip according to this embodiment includes an adaptive voltage scaling AVS module 410, at least one HPM 420, and a logic circuit (not shown in the figure) that includes standard cells of at least two Vt types and performs a function of the chip. The at least one HPM 420 is separately set in the vicinity of critical paths (not shown in the figure) in the logic circuit of the chip. The AVS module 410 is coupled to the at least one HPM 420, to send a clock signal to the HPM 420, enabling the HPM 420 to generate a corresponding pulse signal and at least perform, for the pulse signal, first delaying related to a first Vt type that is in the chip and changes fastest with temperature and second delaying related to a second Vt type that is in the chip and changes slowest with the temperature and generate actual output values accordingly according to the first and second delaying. The AVS module 410 receives the actual output values of the HPM 420 and fits them to acquire a fitting output value that can reflect current performance information of critical paths and regulates a working voltage of the chip.

The following describes fitting the actual output values of the HPM 420 to acquire a fitting output value that can reflect performance information of the current critical paths. The HPM 420 includes a generating module 423, a first delay circuit 421, and a second delay circuit 422. The generating module 423, the delay circuit 421 and the delay circuit 422 in the HPM 420 are all connected to the AVS module 410. The generating module 423 receives the clock signal output by the AVS module 41, acquires a rising edge of the clock signal, and generates, according to the rising edge, the pulse signal. The delay circuits 421 and 422 perform corresponding delaying for the pulse signal, generate output values, and output the output values to the AVS module 410. The first delay circuit 421 includes at least one first delay unit 4211 and a first encoding unit 4217, and an output terminal and an input terminal of the at least one first delay unit 4211 are head-to-tail connected to form a loop. The first encoding unit 4217 performs encoding according to an output value of the at least one first delay unit 4211, to acquire a first actual output value that can reflect a delay situation of the first delay unit 4211 and further reflect current performance information of the first Vt type. Likewise, the second delay circuit 422 includes at least one second delay unit 4221 and a second encoding unit 4227, and an output terminal and an input terminal of the at least one first delay unit 4221 are head-to-tail connected to form a loop. The second encoding unit 4227 performs encoding according to an output value of the at least one second delay unit 4221, to acquire a second actual output value that can reflect a delay situation of the second delay unit 4221 and further reflect current performance information of the second Vt type.

Figure 5:
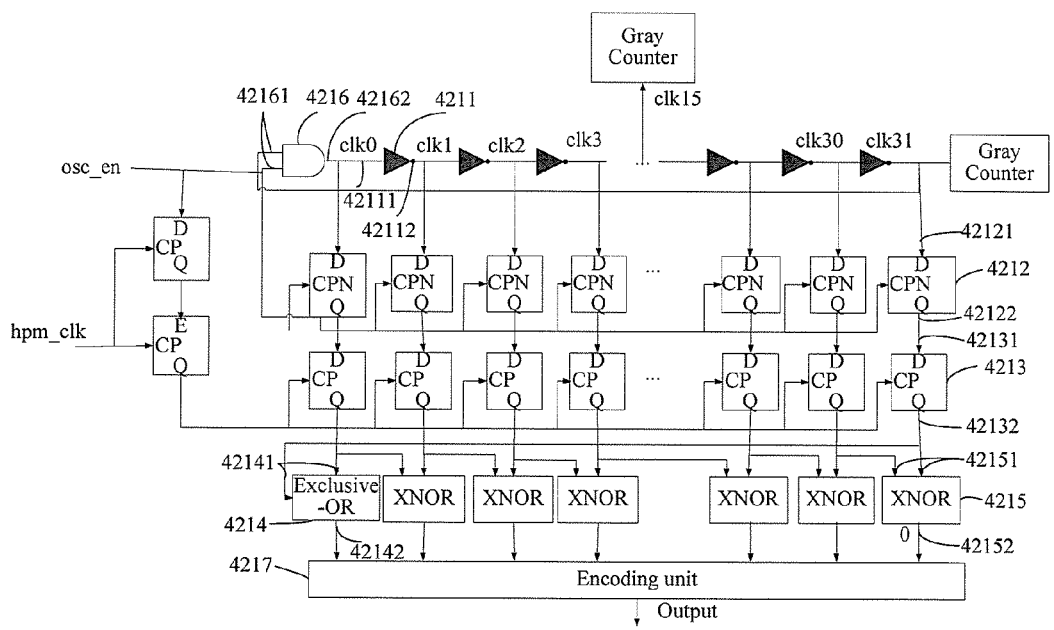
FIG. 5 is a schematic circuit diagram of a delay circuit of an HPM in FIG. 4.

Specifically, FIG. 5 is a schematic circuit diagram of a delay circuit of the HPM in FIG. 4. Referring to FIG. 5, the first delay circuit 421 is basically the same in structure as the second delay circuit 422. In this embodiment, both the first delay circuit 421 and the second delay circuit 422 are ring oscillators. The delay circuits 421 and 422 include at least one delay unit 4211, first D triggers 4212 that are one more than the delay unit 4211 in number, second D triggers 4213 that are one more than the delay unit 4211 in number, an exclusive-OR gate 4214, XNOR gates 4215 that are the same in number as the delay unit 4211, an AND gate 4216 and an encoding unit 4217.

In this embodiment, both the first delay circuit 421 and the second delay circuit 422 include 31 delay units 4211 each. The 31 delay units 4211 are connected in a sequential order. An input terminal 42111 of the first of the delay units 4211 and an output terminal 42112 of the last of the delay units 4211 are connected in the sequential order accordingly to an output terminal 42162 of the AND gate 4216 and one of two input terminals 42161. The output terminal 42162 of the AND gate 4216 and the output terminals 42112 of all delay units 4211 are respectively connected to input terminals 42121 of corresponding first D triggers 4212. Output terminals 42122 of the first D triggers 4212 are respectively connected to input terminals 42131 of corresponding second D triggers 4213. By means of corresponding first D triggers 4212, two output terminals 42132 of the second D triggers 4213 are indirectly connected to the input terminal 42111 of the first delay unit 4211 and the output terminal 42112 of the last delay unit 4211 that are connected in the sequential order. The two output terminals 42132 of the second D triggers 4213 are respectively connected to two input terminals 42141 of the exclusive-OR gate 4214. The two output terminals 42132 of the second D triggers 4213, which are indirectly connected to two adjacent output terminals 42112 of the delay units 4211, are respectively connected to two input terminals 42151 of the corresponding XNOR gates 4215. An output terminal 42142 of the exclusive-OR gate 4214 and the output terminals 42152 of all XNOR gates 4215 are respectively connected to the encoding unit 4217, enabling the encoding unit 4217 to acquire current output values (that is, clk0 to clk31) of the AND gate 4216 and the delay units 4211 by using the D trigger 4212 and the D trigger 4213 and encode the acquired output values, to use the encoded output values as output values of the delay circuit 421.

The delay unit 4211 includes a buffer and a phase inverter (not shown in the figure), so that the output value of the delay unit 4211 has a certain delay t0, and the output value is logical NOT of an input value. Therefore, the output values are different between adjacent delay units 4211 that are connected in the sequential order. A pulse signal osc_en that is generated by the HPM 420 according to a period of the clock signal of the AVS module 410 is a high level signal with a pulse width of t1. The HPM 420 inputs the pulse signal osc_en to the delay units 4211 that are connected in the sequential order, that is, the output values of two adjacent delay units 4211 that are closest to a falling edge or the rising edge of the pulse signal osc_en are the same.

Assuming t1 is 4t0, at time t1, clk0 to clk31 is successively 1, 0, 1, 0, 0, 1, 0, 1, 0, 1, 0, 1 . . . 1. The HPM 420 enables the D triggers 4212 and 4213 to ensure that output values and input values of the D triggers 4212 and 4213 the same. Therefore, the output values of the second D triggers 4213 are successively clk0 to clk31 from left to right. When the output values of the adjacent delay units 4211 are the same, an output value of the XNOR gates 4215 that are indirectly connected to the adjacent delay units 4211 is 1. Correspondingly, output signals of the exclusive-OR gate 4214 and the XNOR gates 4215 are respectively 0, 0, 0, 0, 1, 0, 0, 0, 0, 0, 0, 0 . . . 0 from left to right and input the output signals to the encoding unit 4217. The encoding unit 4217 performs encoding according to the output signals of the corresponding exclusive-OR gate 4214 and XNOR gates 4215, and uses the encoding output value as the output value of the delay circuit 421.

In a case where the pulse width of the pulse signal osc_en does not change, when the t0 of the delay unit 4211 is different, the exclusive-OR gate 4214 and XNOR gates 4215 whose output value is 1 are also different, and furthermore, the encoding output value of the encoding unit 4217 is correspondingly different. Therefore, the output value of the delay circuit 421 can reflect a current delay situation of the delay unit 4211.

The delay of the delay unit 4211 is related to voltage and temperature. Within the range of normal working voltages, at the same temperature, the delay is shorter when the working voltage of the delay unit 4211 is lower; otherwise, at the same temperature, the shorter the delay of the delay unit 4211 is, the higher the working voltage of the delay unit 4211 becomes. The delay is the same when the delay unit 4211 works with the minimum working voltage at any temperature, and therefore, at this moment, the output value of the encoding unit 4217 is also the same. After a reference output value of the encoding unit 4217 is determined when the delay unit 4211 works with the minimum working voltage at any temperature, the output value of the encoding unit 4217 at the current temperature and working voltage may be compared with the reference output value, to determine how the delay varies at the current temperature when the delay unit 4211 works with the current working voltage and the minimum working voltage respectively. Therefore, a relationship between the current working voltage and the required minimum working voltage of the delay unit 4211 can be reflected.

Figure 1:
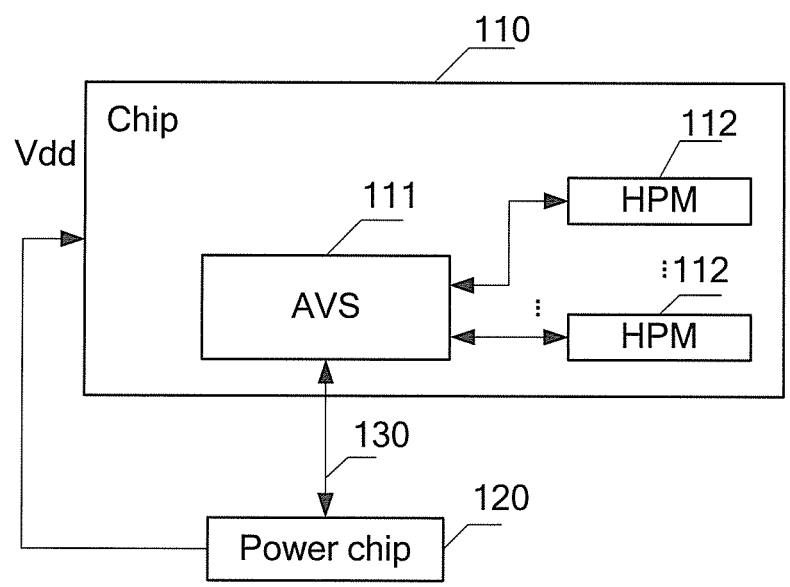
FIG. 1 is a schematic structural diagram of a chip according to the prior art.
Figure 2:
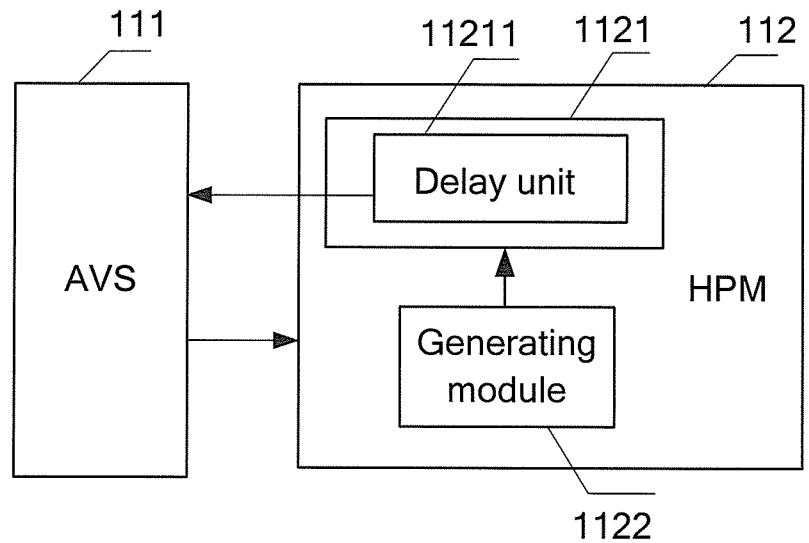
FIG. 2 is a schematic structural diagram of an HPM in FIG. 1.
Figure 3:
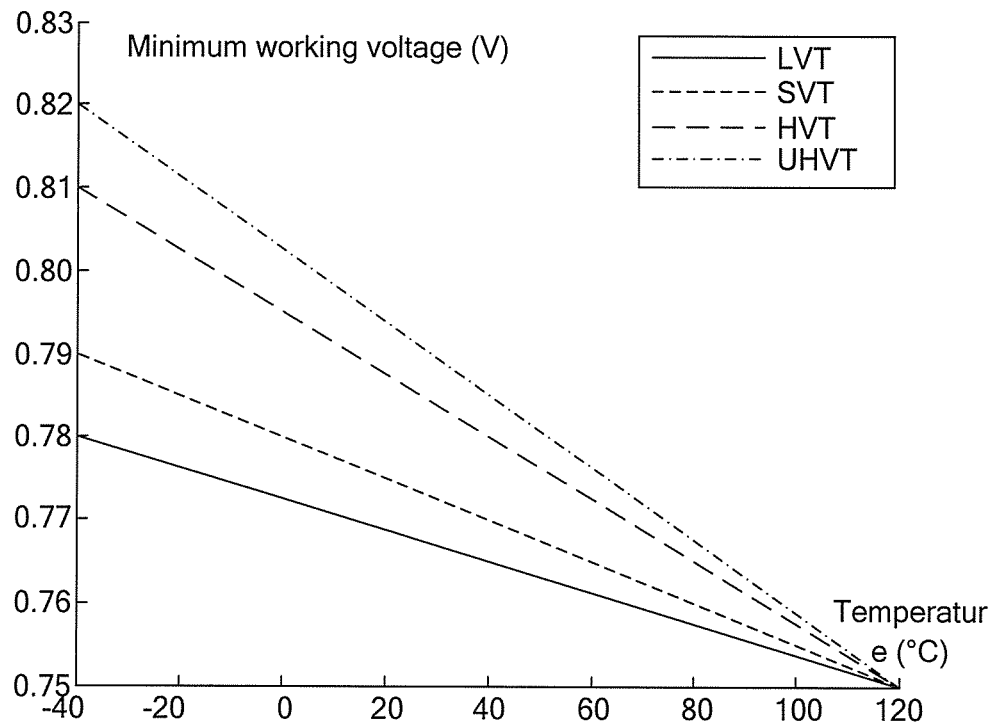
FIG. 3 is a line graph of a relationship between a minimum working voltage of standard cells of different Vt types and temperature under a same technical condition.

The Vt type is described as follows: the standard cells with different threshold voltages are of different Vt types. The threshold voltage is a minimum voltage in a digital logic circuit that may trigger a state "1" of the standard cells. Generally, under a same technical condition, the required minimum working voltage of the standard cells of different Vt types changes with the temperature at a different speed. For example, with reference to FIG. 3, it can be known that in the standard cells made under the TSMC28HP techniques, the speeds at which four different Vt types LVT, SVT, HVT, and UHVT change with the temperature are ranked from slow to fast as follows: LVT, SVT, HVT, and UHVT. However, the speed at which the required minimum working voltage of the standard cells of the same Vt type changes with the temperature is the same.

Therefore, the relationship between the required minimum working voltage and the current working voltage at the current temperature of the Vt type that is same as the delay unit 4211 may be determined according to the output value of the encoding unit 4217 of the delay units 421 and 422. That is, the output value of the encoding unit 4217 can reflect in real time current performance information of the critical paths of the same Vt type as the delay unit 4211 in the chip. The Vt type of the critical path is briefly illustrated as follows: the critical paths includes a plurality of standard cells, and therefore the Vt type of the critical paths depends on the Vt type of the standard cells. Generally, for the Vt type that changes faster with the temperature, the required minimum working voltage at the same temperature is the higher. That is, the required minimum working voltage of the Vt type that changes fastest with the temperature in the critical path is the required minimum working voltage of the critical path, and therefore the Vt type of the critical path is the Vt type that changes fast with the temperature in the critical path.

The critical paths in the chip are logical paths whose timing margins are the worst in the chip. Therefore, the minimum working voltage of the chip required at the moment is the minimum working voltage of the current critical paths in the chip required at the moment while performance information of the chip is the performance information of the current critical paths. In this embodiment, the chip is a multi-Vt system. That is, the standard cells of different Vt types are set in the chip. Generally, there are multiple critical paths in a logical circuit of the chip. For different critical paths in the multi-Vt chip, their Vt types may also be different. Under different conditions such as different temperature or a different frequency of a signal in the logical circuit, the critical paths the signal goes through may be different. That is, for the multi-Vt chip, the Vt type of the current critical paths at the different temperatures may be different. For example, the Vt types of the first, second, and third critical paths of the chip are SVT, HVT, LVT, respectively. At −40° C., the critical path of the chip is the first critical path of SVT type; at 0° C., the critical path of the chip is the second critical path of HVT type; and at 40° C., the critical path of the chip is the third critical path of LVT type. Therefore, by controlling a proportion of the Vt types that change fastest and slowest with the temperature, a Vt type combination of the critical paths in the chip at different temperatures may be fitted.

In this embodiment, the HPM 420 is set in the vicinity of the critical paths in the chip, so that the HPM 420 is in the same environment (such as being at the same temperature) as the critical paths; the techniques and working voltage of the delay units 4211 and 4221 of the HPM 420 are the same as those of the corresponding critical paths, so as to monitor, by using the output value of the HPM 420, the performance information of the critical paths in the vicinity of the HPM 420 when the critical paths work with the current working voltage at the current temperature. The Vt type of the first delay unit 4211 of the first delay circuit 421 in the HPM 420 is the first Vt type that is used by the chip and changes fastest with the temperature. The first delaying that the first delay unit 4211 performs for the pulse signal generated by the HPM 420 corresponds to the current performance information of the first Vt type of the critical paths in the vicinity of the HPM 420. According to the first delay, the first delay circuit 421 generates the first actual output value that can reflect the current performance information of the critical paths of the first Vt type. Likewise, the Vt type of the second delay unit 4221 of the second delay circuit 422 is the second Vt type that is used by the chip and changes slowest with the temperature. According to the second delay of the second delay unit 4221, the second delay circuit 422 generates the second actual output value that can reflect the current performance information of the critical paths of the second Vt type. By controlling weights of the first and second actual output values, the fitting output value that is corresponding to the Vt type of the current critical paths in the chip is acquired, to correctly reflect the current performance information of the chip.

After acquiring the first and second actual output values of the HPM 420, by controlling the proportion of the first and second actual output values to the AVS module 410 performs fitting to acquire the fitting output value that is corresponding to the Vt type of the current critical paths in the chip, to reflect the current performance information of the current critical paths in the chip in the vicinity of the HPM 420. The current performance information of the critical paths reflects a situation as to whether the current working voltage of the critical paths meets working requirements. The AVS module 410 fits the output values and determines a relationship between the current working voltage and the minimum working voltage of the current critical paths required at the moment, to correspondingly regulate the working voltage of the chip by controlling an external power module (not shown in the figure). Certainly, the AVS module does not necessarily regulate the working voltage of the chip by controlling the external power module. In another embodiment where the chip includes a power module, the AVS module regulates the working voltage of the chip by controlling the power module in the chip, to which no limitation is made.

Figure 6:
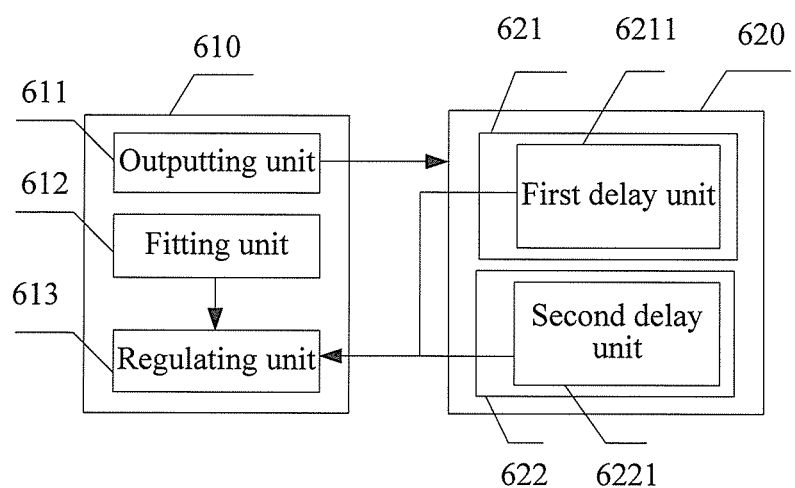
FIG. 6 is a schematic structural diagram of a chip according to another embodiment of the present application.

Refer to FIG. 6, and FIG. 6 is a schematic structural diagram of a chip according to an embodiment of the present application. The chip in this embodiment is basically the same in structure as the chip described in the foregoing embodiment, and more specifically, an AVS module 610 of the chip includes an output unit 611, a fitting unit 612 and a regulating unit 613.

The output unit 611 is configured to output a clock signal to an HPM 620, so that the HPM 620 generates a corresponding pulse signal according to the clock signal and performs, for the pulse signal, delaying corresponding to a current situation of the critical paths in the chip, to generate a corresponding output value.

In this embodiment, a first delay unit 6211 of the HPM 620 performs first delaying for the pulse signal to generate a first actual output value; and a second delay unit 6221 performs second delaying for the pulse signal to generate a second actual output value. Because a Vt type of the first delay unit 6211 is a first Vt type in the chip and a Vt type of the second delay unit 6221 is a second Vt type in the chip, the first and second actual output values can respectively reflect current performance information of the first and second Vt types in the chip.

The fitting unit 612 is configured to at least acquire and fit the first and second actual output values of the HPM 620, to acquire a fitting output value that reflects current performance information of corresponding critical paths and output the fitting output value to the regulating unit 613. The fitting unit 612 acquires the fitting output value by controlling a proportion of the first actual output value and the second actual output value, so that the fitting output value of the HPM 620 corresponds to the Vt types of the critical paths in the vicinity of the HPM 620 in the chip, that is, the fitting output value can reflect the current performance information of the corresponding critical paths in the chip.

The regulating unit 613 is configured to determine a relationship between a current working voltage of the chip and a minimum working voltage required at the moment according to the fitting output value and regulate a working voltage of the chip. Specifically, the regulating unit 613 compares the fitting output value of the HPM 620 with a predetermined reference value of the HPM, to determine the relationship between the current working voltage of the chip and the minimum working voltage required at the moment. When the current working voltage of the chip is higher than the minimum working voltage, the AVS module 610 decreases the working voltage of the chip by controlling an external power module (not marked in the figure). When it is indicated that the current working voltage of the chip is lower than the minimum working voltage, the AVS module 610 increases the working voltage of the chip by controlling the external power module. When the current working voltage of the chip is equal to the minimum working voltage, the AVS module 610 maintains the current working voltage of the chip by controlling the external power module.

Furthermore, the present application further provides another embodiment of the chip, and the chip is basically the same in structure as that in the previous embodiment.

Compared with the previous embodiment, the fitting unit in this embodiment is specifically configured to calculate a first product acquired by multiplying the first actual output value of the HPM by a predetermined first weight, and calculate a second product acquired by multiplying the second actual output value of the HPM by a predetermined second weight, to acquire a sum of the first product and the second product and use the sum as the fitting output value of the HPM. The fitting unit acquires a first weight $\alpha$ and a second weight $\beta$ in advance, and after acquiring a first actual output value X1 and a second actual output value X2, the fitting unit acquires a fitting output value $X_{fitting}$ according to the formula $X_{fitting}=X1\times\alpha+X2\times\beta$, that is, by controlling the proportion of the first actual output value and the second actual output value according to the first weight and the second weight, acquire the fitting output value that can reflect the current performance information of the critical paths in the chip.

The regulating unit is specifically configured to: determine whether a difference acquired by subtracting a predetermined reference value from the fitting output value is larger than zero or smaller than zero; if the difference is larger than zero; determine that the current working voltage of the chip is higher than the minimum working voltage required at the moment and decrease the working voltage of the chip; and if the difference is smaller than zero, determine that the current working voltage of the chip is lower than the minimum working voltage required at the moment and increase the working voltage of the chip. The predetermined reference value is the fitting output value of the hardware performance monitor when the chip works with the minimum working voltage at any temperature.

After acquiring the fitting output value of the HPM, the regulating unit acquires a difference S acquired by subtracting a predetermined reference value $R_{rcc}$ from the fitting output value of the HPM according to the formula $S=X_{fitting}-R_{rcc}$ and determines whether S is larger than zero or smaller than zero. The reference value $R_{rcc}$ is a fitting output value of the HPM to ensure that the chip works with the minimum working voltage at any temperature. Furthermore, the regulating unit is further configured to acquire, from data tested by an Automatic Test Equipment, actual output values of the HPM when the chip works with the minimum working voltage at any temperature and respectively fit the actual output values of the HPM according to the predetermined first and second weights to acquire and save the reference value $R_{rcc}$.

In this embodiment, if the difference acquired by subtracting the predetermined reference value from the fitting output value of the HPM is larger than zero, it indicates that the current working voltage of the chip is higher than the required minimum working voltage. The regulating unit controls the external power module to output a working voltage that is 10 mV lower than the original working voltage. Afterwards, the AVS module continues acquiring the first and second actual output values of the HPM, to acquire the fitting output value. According to the fitting output value, the regulating unit continues to determine whether the difference acquired by subtracting the predetermined reference from the current fitting output value of the HPM is larger than zero or smaller than zero. When the difference is still larger than zero, the regulating unit continues controlling the external power module to output a working voltage that is 10 mV lower than the previous working voltage until the difference is zero or begins to be smaller than zero, and then increases the working voltage 10 mV and uses the increased voltage as the current working voltage of the chip.

Likewise, if the difference acquired by subtracting the predetermined reference value from the fitting output value of the HPM is smaller than zero, it indicates that the current working voltage of the chip is lower than the required minimum working voltage. The regulating unit controls the external power module to output a working voltage that is 10 mV higher than the original working voltage. Afterwards, the AVS module continues acquiring the first and second actual output values of the HPM, to acquire the fitting output value. According to the fitting output value, the regulating unit continues to determine whether the difference acquired by subtracting the predetermined reference from the current fitting output value of the HPM is larger than zero or smaller than zero. When the difference is still smaller than zero, the regulating unit continues controlling the external power module to output a working voltage that is 10 mV higher than the previous working voltage until the difference is zero or begins to be larger than zero.

Certainly, in another embodiment, a voltage difference of larger than or smaller than 10 mV may be adopted as a voltage parameter for the working voltage of the chip to decrease or increase each time, which is not limited herein.

In a further optimal way, the regulating unit is further configured to determine whether the difference acquired by subtracting the reference value from the fitting output value of the HPM is larger than or smaller than zero and determine whether the difference acquired by subtracting the reference value from the fitting output value of the HPM is larger than a predetermined threshold or not. When the difference acquired by subtracting the reference value from the fitting output value is larger than zero and larger than the predetermined threshold, the regulating unit decreases the working voltage of the chip; when the difference acquired by subtracting the reference value from the fitting output value is smaller than zero yet larger than the predetermined threshold, the regulating unit increases the working voltage of the chip. When the difference acquired by subtracting the reference value from the fitting output value of the HPM is smaller than the predetermined threshold, the regulating unit determines that the current working voltage of the chip is very close to the minimum working voltage, and therefore has no need to regulate the current working voltage of the chip. The predetermined threshold may be configured as a different value according to a practical application, which is not limited herein.

This embodiment further provides a process of acquiring the predetermined first and second weights.

(1) Acquire, from the data tested by the Automatic Test Equipment, the minimum working voltage of the chip at the different temperatures and the first and second actual output values of the HPM when the chip works with different working voltages at the different temperatures.

In this embodiment, the minimum working voltage of the chip is acquired every 5° C. within the range of −40° C. to 120° C. Nevertheless, in another embodiment, the minimum working voltage of the chip may be acquired within a wider or narrower temperature range according to an actual situation; meanwhile, the minimum working voltage of the chip may be acquired according to a part of temperatures that are randomly chosen with a bigger or smaller temperature difference, such as 10° C. or 1° C., from the temperature range, which is not limited herein.

In addition, for this embodiment acquiring the first and second actual output values of the HPM at some temperature when the chip works with the different working voltages, the actual output values of the HPM corresponding to a part of working voltages within the range may be acquired according to the range of common working voltage of the chip. For example, a range of the common working voltage of the chip is from 0.5 V to 1 V, and a new voltage may be configured as the working voltage with a difference of 0.01 V each time within the range of 0.5 V to 1 V, to acquire all actual output values of the HPM corresponding to all the voltages with a difference of 0.01 V within the range of 0.5 V to 1 V.

Certainly, in another embodiment, the minimum working voltage of the chip at the different temperatures as well as the actual output values of the HPM when the chip works with the different working voltages at the different temperatures may be directly acquired from data tested during a tape-out of the chip, which is not limited herein.

(2) Adopt the least square method to acquire the first weight and the second weight according to the minimum working voltage of the chip at the different temperatures and the first and second actual output values of the HPM when the chip works with the different working voltages at the different temperatures, and the first weight and the second weight are sent to the fitting unit.

The following illustrates adopting the least square method to acquire the first and second weights.

Firstly, a curve of actual relationship between the required minimum working voltage of the chip and the temperature is acquired according to the minimum working voltage acquired at the different temperatures.

Secondly, a first group of values are assigned to the first weight $\alpha$ and the second weight $\beta$, where the sum of the first weight $\alpha$ and the second weight $\beta$ is equal to 1. For example, the first group of values of the first weight $\alpha$ and the second weight $\beta$ are as follows: $\alpha=0$, and $\beta=1$.

After the minimum working voltage of the chip at different temperatures is acquired, the reference value $R_{rcc}$ is calculated according to the first and second actual output values of the HPM acquired when the chip works with the minimum working voltage at some temperature and the formula $R_{rcc}=X1_{Vmin}\times\alpha X2_{Vmin}\times\beta$. For example, $X1_{Vmin}=0.3$, $X2_{Vmin}=0.4$, and according to the above formula, it is known: $R_{rcc}=0.4$. $X1_{Vmin}$ and $X2_{Vmin}$ are, respectively, the first actual output value of the first delay circuit and the second actual output value of the second delay circuit in the HPM when the chip works with the minimum working voltage at some temperature. The reference value is the fitting output value of the HPM when the chip works with the minimum working voltage at any temperature. It should be noted that in this embodiment, the reference value is directly acquired according to the formula $R_{rcc}=X1_{Vmin}\times\alpha+X2_{Vmin}\times\alpha$. However, in another embodiment of the practical application, considering the actual situation, a predetermined margin needs to be added to the reference value on the basis of the above formula, to ensure that the reference value can reflect performance of the chip when the chip works with the minimum working voltage at any temperature.

Then, $S_{Vi}$ that corresponds to the different working voltages of the chip at a specific temperature is acquired by calculation according to the first and second actual output values of the HPM when the chip works with the different working voltages at some temperature, the acquired reference value $R_{rcc}$ and the formula $S=(X1\times\alpha+X2\times\beta)-R_{rcc}$. After $S_{Vmin}$ that is equal to zero or closest to zero is acquired from $S_{Vi}$, the minimum working voltage of the chip is determined according to a group of actual output values of the HPM to which $S_{Vi}$ corresponds. For example, when the chip works at 40° C., when the working voltages of the chip are V1=0.75 V, V2=0.76 V, V3=0.77 V, respectively, the actual output values of the HPM are $X1_{V1}=0.1$, $X2_{V1}=0.2$; $X1_{V2}=0.3$, $X2_{V2}=0.4$; $X1_{V3}=0.5$, $X2_{V3}=0.6$, respectively; and $S_{V1}=-0.2$, $S_{V2}=0$, and $S_{V3}=0.2$ are separately calculated according to the acquired reference value $R_{rcc}=0.4$, $\alpha=0$, $\beta=1$, and the formula $S=(X1\times\alpha+X2\times\beta)-R_{rcc}$. It may be known that $S_{V2}=0$, that is, when $\alpha=0$ and $\beta=1$, the required minimum working voltage of the chip at 40° C. may be $V_{min}=V2=0.76$ V.

Likewise, according to the actual output values of the HPM when the chip works with the different working voltages at other temperatures, the required minimum working voltage of the chip at all temperatures when $\alpha=0$ and $\beta=1$ may be acquired, and a curve of first possible relationship between the required minimum working voltage of the chip and the temperature when $\alpha=0$ and $\beta=1$ may also be acquired.

After the curve of first possible relationship between the required minimum working voltage of the chip and the temperature when $\alpha=0$ and $\beta=1$ is acquired, a second group of values are assigned to the first weight $\alpha$ and the second weight $\beta$, and according to the foregoing steps, a curve of second possible relationship between the required minimum working voltage of the chip and the temperature when the second group of values are assigned to the first weight $\alpha$ and the second weight $\beta$ is acquired. By analogy, all curves of possible relationship between the required minimum working voltage of the chip and the temperature when all groups of values are assigned to the first weight $\alpha$ and the second weight $\beta$ are acquired. Assigning values to the first weight $\alpha$ and the second weight $\beta$ has to meet one condition that the sum of the first weight $\alpha$ and the second weight $\beta$ is 1. In this embodiment, a new group of values are assigned to the first weight $\alpha$ and the second weight $\beta$ with a difference of 0.1 each time within a range from 0 to 1. For example, ten groups of values are assigned respectively to the first weight $\alpha$ and the second weight $\beta$ in the following manner: $\alpha=0$, $\beta=1$; $\alpha=0.1$, $\beta=0.9$; $\alpha=0.2$, $\beta=0.8$; ... $\alpha=1$, $\beta=0$; and curves of possible relationship between the required minimum working voltage of the chip and the temperature when the ten groups of values are assigned to the first weight $\alpha$ and the second weight $\beta$ are acquired respectively. It may be understood that the new group of values are not necessarily assigned to the first weight $\alpha$ and the second weight $\beta$ with the difference of 0.1 each time within the range of 0 to 1. In another embodiment, values may be assigned to the first weight $\alpha$ and the second weight $\beta$ with a bigger or smaller value difference each time within the range of 0 to 1, which is not limited herein.

Finally, vector distances from the curve of actual relationship between the required minimum working voltage of the chip and the temperature to each curve of possible relationship between the required minimum working voltage of the chip and the temperature are calculated respectively, and a curve of possible relationship between the required minimum working voltage of the chip and the temperature that has a shortest distance to the curve of actual relationship between the required minimum working voltage of the chip and the temperature is acquired, and the values of the first weight α and the second weight β to which the curve of the possible relationship corresponds is acquired.

It should be noted that the first weight and the second weight are not necessarily determined by means of the least square method. In another embodiment, any manner that determines the first weight and the second weight and enables the fitting output value of the HPM to correctly reflect the current performance information of the critical paths in the chip may be used, which is not limited herein. Optionally, for an HPM that includes more than two delay circuits, similar to the least square method, according the minimum working voltages of the chip at the different temperatures as well as actual output values of the more than two delay circuits in the HPM when the chip works with the different working voltages at the different temperatures, the multi-dimensional least square method may be adopted in the present application to determine the first weight and the second weight.

In addition, the HPM in the present invention not necessarily includes two delay circuits. In another embodiment, the HPM may further includes more than two delay circuits, and the more than two delay circuits at least include two delay circuits in which Vt types of delay units are those used by the chip and change fastest and slowest with the temperature respectively. For example, in still another embodiment, in addition to the foregoing first and second delay circuits, the HPM further includes a third delay circuit, and likewise, the third delay circuit includes at least one third delay unit of a third Vt type and one third encoding unit. An output terminal and an input terminal of the at least one third delay unit are head-to-tail connected to form a loop. The third encoding unit performs encoding according to an output value of the at least one third delay unit, to acquire a third actual output value that can reflect a delay situation of the third delay unit and further reflect current performance information of the third Vt type, where the third Vt type is a Vt type that is in the chip and changes between fastest and lowest with the temperature. The fitting unit of the AVS module fits the first, second, and third actual output values according to weights of the first, second, and third actual output values to acquire a fitting output value that can reflect current performance information of the critical paths in the chip.

Figure 7:
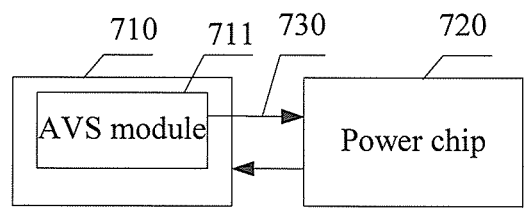
FIG. 7 is a schematic structural diagram of a chip system according to an embodiment of the present application.

An embodiment of the present application further provides a chip system. Referring to FIG. 7, FIG. 7 is a schematic structural diagram of the chip system according to the embodiment of the present application. The chip system includes a chip 710, a power chip 720, and a voltage interface 730, where the chip 710 is the chip described in the foregoing embodiments, and therefore details are not described for the chip 710 again. If necessary, reference may be made to FIGS. 4 to 6 and written descriptions in the foregoing embodiments.

The chip 710 is coupled to the power chip 720, and the voltage interface 730 is coupled to the AVS module 711 of the chip 710 and the power chip 720.

The power chip 720 is configured to supply power for the chip 710. When it is determined that a working voltage of the chip 710 needs to be increased, the AVS module 711 of the chip 710 instructs, by using the voltage interface 730, the power chip 720 to input to the chip 710 a working voltage that is a predetermined value higher than an original working voltage; when it is determined that the working voltage of the chip 710 needs to be decreased, the AVS module 711 of the chip 710 instructs, by using the voltage interface 730, the power chip 720 to input to the chip 710 a working voltage that is a predetermined value lower than the original working voltage.

Figure 8:
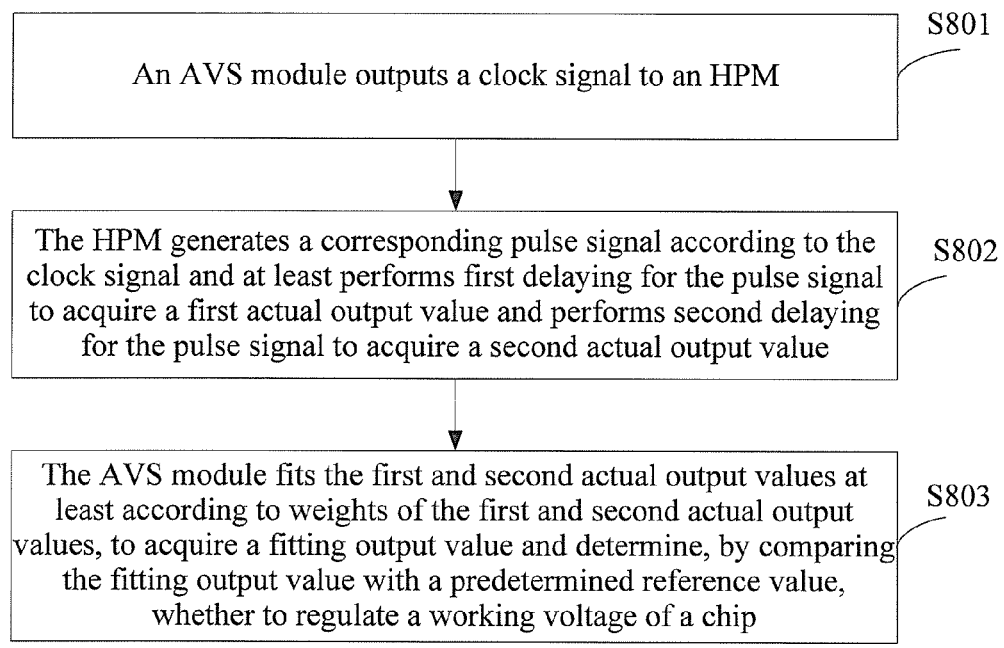
FIG. 8 is a flowchart of a voltage regulation method according to an embodiment of the present application.

FIG. 8 is a flowchart of a voltage regulation method according to an embodiment of the present application. Referring to FIG. 8, the method is used to regulate a working voltage of the chip described in the foregoing embodiments, and the method includes the following steps:

Step 801: An AVS module outputs a clock signal to an HPM.

The AVS module outputs the clock signal to the HPM, so that the HPM generates a pulse signal with a corresponding pulse width according to the clock signal and performs, for the pulse signal, delaying corresponding to a current situation of critical paths in the chip, to generate a corresponding output value.

Step 802: The HPM generates a corresponding pulse signal according to the clock signal and performs, for the pulse signal, first delaying related to a first Vt type that is in the chip and changes fastest with temperature, to acquire a first actual output value that can reflect current performance information of the first Vt type and performs, for the pulse signal, second delaying related to a second Vt type that is in the chip and changes slowest with the temperature, to acquire a second actual output value that can reflect current performance information of the second Vt type and outputs the first and second actual output values to the AVS module.

In this embodiment, the HPM is set in the vicinity of the critical paths in the chip, so that the HPM is in the same environment of temperature as the critical paths, and process and working voltage of the HPM are the same as those of corresponding critical paths, thereby ensuring that the output value of the HPM can reflect performance information of the corresponding critical paths when the critical paths work with the current working voltage at the current temperature. The HPM at least includes a first delay circuit and a second delay circuit; the first delay circuit includes at least one first delay unit; and the second delay circuit includes at least one second delay unit. The Vt type of the first delay unit is the first Vt type that is in the chip and changes fastest with the temperature, and the Vt type of the second delay unit is the second Vt type that is in the chip and changes slowest with the temperature.

The HPM generates the corresponding pulse signal according to the clock signal and at least inputs the generated pulse signal with a specific pulse width to the first and second delay circuits respectively. The first delay unit of the first delay circuit performs the first delaying for the pulse signal to generate the first actual output value, and the second delay unit of the second delay circuit performs the second delaying for the pulse signal to generate the second actual output value. Because the Vt type of the first delay unit is the first Vt type in the chip and the Vt type of the second delay unit is the second Vt type in the chip, the first delay corresponds to the current performance information of the critical paths of the first Vt type and the second delay corresponds to the current performance information of the critical paths of the second Vt type. Therefore, the first and second actual output values can reflect the current performance information of the first and second Vt types in the chip respectively.

Step 803: The AVS module fits the first and second actual output values at least according to weights of the first and second actual output values to acquire a fitting output value that can reflect current performance information of critical paths, and determine, by comparing the fitting output value with a predetermined reference value, whether to regulate the working voltage of the chip.

The AVS module at least acquires the first and second actual output values and acquires the fitting output value by controlling a proportion of the first actual output value and the second actual output value, so that the fitting output value of the HPM corresponds to the Vt types of the critical paths in the vicinity of the HPM in the chip, that is, the fitting output value can reflect the current performance information of the corresponding critical paths in the chip.

After acquiring the fitting output value of the HPM, the AVS module compares the fitting output value of the HPM with a predetermined reference value of the HPM, to determine the relationship between the current working voltage and the minimum working voltage of the chip required at the moment. When the current working voltage of the chip is higher than the minimum working voltage, the AVS module decreases the working voltage of the chip. When the current working voltage of the chip is lower than the minimum working voltage, the AVS module increases the working voltage of the chip. When the current working voltage of the chip is equal to the minimum working voltage, the AVS module maintains the current working voltage of the chip. The predetermined reference value is the fitting output value of the HPM when the chip works with the minimum working voltage at any temperature.

Figure 9:
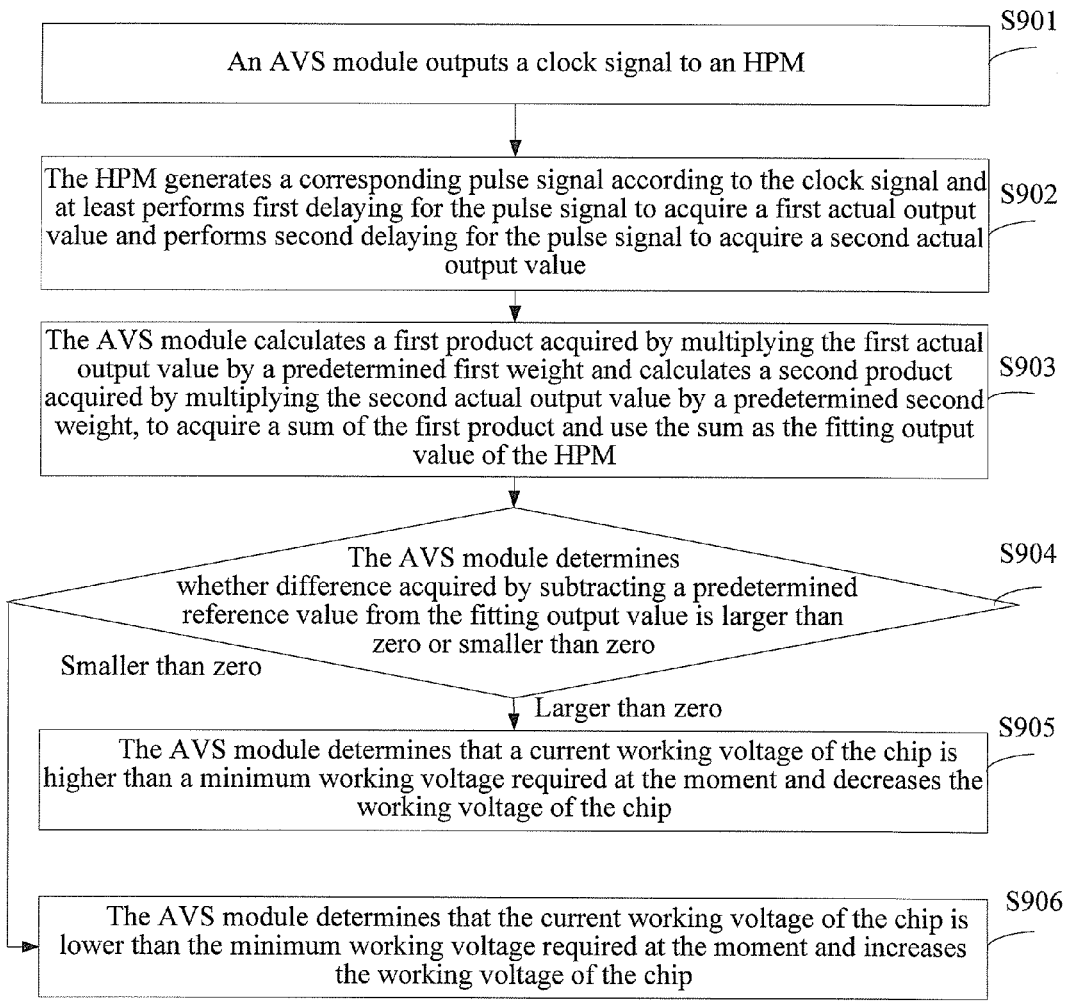
FIG. 9 is a flowchart of a voltage regulation method according to another embodiment of the present application.

FIG. 9 is a flowchart of a voltage regulation method according to another embodiment of the present application. Referring to FIG. 9, the method in this embodiment includes the following steps:

Step 901: An AVS module outputs a clock signal to an HPM.

The AVS module outputs the clock signal to the HPM, so that the HPM generates a pulse signal with a corresponding pulse width according to the clock signal and performs, for the pulse signal, delaying corresponding to a current situation of critical paths in a chip, to generate a corresponding output value.

Step 902: The HPM generates a corresponding pulse signal according to the clock signal and performs, for the pulse signal, first delaying related to a first Vt type that is in the chip and changes fastest with temperature, to acquire a first actual output value that can reflect current performance information of the first Vt type and performs, for the pulse signal, second delaying related to a second Vt type that is in the chip and changes slowest with the temperature, to acquire a second actual output value that can reflect current performance information of the second Vt type and outputs the first and second actual output values to the AVS module.

In this embodiment, the HPM is set in the vicinity of the critical paths in the chip, so that the HPM is in the same environment of temperature as the critical paths, and techniques and working voltage of the HPM are the same as those of corresponding critical paths, thereby ensuring that the output value of the HPM can reflect performance information of the corresponding critical paths when the critical paths work with the current working voltage at the current temperature. The HPM generates the corresponding pulse signal according to the clock signal and at least inputs the generated pulse signal with a specific pulse width to the first and second delay circuits respectively. The first delay unit of the first delay circuit performs the first delaying for the pulse signal to generate the first actual output value, and the second delay unit of the second delay circuit performs the second delaying for the pulse signal to generate the second actual output value. The first and second actual output values are capable of reflecting the current performance information of the first and second Vt types in the chip respectively.

Step 903: The AVS module calculates a first product acquired by multiplying the first actual output value of the HPM by a predetermined first weight and calculates a second product acquired by multiplying the second actual output value of the HPM by a predetermined second weight, to acquire a sum of the first product and the second product and use the sum as the fitting output value of the HPM.

The AVS module acquires a first weight $\alpha$ and a second weight $\beta$ in advance, and after acquiring a first actual output value X1 and a second actual output value X2, the AVS module acquires a fitting output value of the chip $X_{fitting}$ according to the formula $X_{fitting}=X1\times\alpha+X2\times\beta$, that is, by controlling a proportion of the first actual output value and the second actual output value according to the first weight and the second weight, acquires the fitting output value that can reflect the current performance information of the critical paths in the chip.

The first weight and the second weight may be determined by adopting the least square method. Specifically, (1) Acquire, from the data tested by an Automatic Test Equipment, the minimum working voltage of the chip at different temperatures and the first and second actual output values of the HPM when the chip works with different working voltages at the different temperatures.

In this embodiment, the minimum working voltage of the chip is acquired every 5° C. within the range of −40° C. to 120° C. Certainly, in another embodiment, the minimum working voltage of the chip may be acquired within a wider or narrower temperature range according to an actual situation; meanwhile, the minimum working voltage of the chip may be acquired according to a part of temperatures that are randomly chosen with a bigger or smaller temperature difference, such as 10° C. or 1° C., from the temperature range, which is not limited herein.

In addition, for this embodiment acquiring the first and second actual output values of the HPM at some temperature when the chip works with the different working voltages, the actual output values of the HPM corresponding to apart of working voltages within the range may be acquired according to the range of common working voltage of the chip. For example, a range of the common working voltage of the chip is from 0.5 V to 1 V, and a new voltage may be configured as the working voltage with a difference of 0.01 V each time within the range of 0.5 V to 1 V, to acquire all actual output values of the HPM corresponding to all the voltages with a difference of 0.01 V within the range of 0.5 V to 1 V.

Certainly, in another embodiment, the minimum working voltage of the chip at the different temperatures as well as the actual output values of the HPM when the chip works with the different working voltages at the different temperatures may be directly acquired from data tested during a tape-out of the chip, which is not limited herein.

(2) Adopt the least square method to acquire the first weight and the second weight according to the minimum working voltage of the chip at the different temperatures and the first and second actual output values of the HPM when the chip works with the different working voltages at the different temperatures.

Firstly, a curve of actual relationship between the required minimum working voltage of the chip and the temperature is acquired according to the minimum working voltage acquired at the different temperatures.

Secondly, a first group of values are assigned to the first weight $\alpha$ and the second weight $\beta$, where the sum of the first weight $\alpha$ and the second weight $\beta$ is equal to 1. For example, the first group of values of the first weight $\alpha$ and the second weight $\beta$ are as follows: $\alpha=0$, and $\beta=1$.

After the minimum working voltage of the chip at the different temperatures is acquired, the reference value $R_{rcc}$ is calculated according to the first and second actual output values of the HPM acquired when the chip works with the minimum working voltage at some temperature and the formula $R_{rcc}=X1_{Vmin}\times\alpha+X2_{Vmin}\times\beta$. For example, $X1_{Vmin}=0$ 0.3, $X2_{Vmin}=0.4$, and according to the above formula, obtain: $R_{rcc}=0.4$. $X1_{Vmin}$ and $X2_{Vmin}$ are, respectively, the first actual output value of the first delay circuit and the second actual output value of the second delay circuit in the HPM when the chip works with the minimum working voltage at some temperature. The reference value is the fitting output value of the HPM when the chip works with the minimum working voltage at any temperature. Because the output values of the HPM are the same when the chip works with the minimum working voltage at any temperature, the reference value may be acquired by calculation according to the first actual output value and the second actual output values when the chip works with the minimum working voltage at any temperature. It should be noted that in this embodiment, the reference value is directly acquired according to the formula $R_{rcc}=X1_{Vmin}\times\alpha+X2_{Vmin}\times\beta$. However, in another embodiment of the practical application, considering the actual situation, a predetermined margin needs to be added to the reference value on the basis of the above formula, to ensure that the reference value can reflect performance of the chip when the chip works with the minimum working voltage at any temperature.

$S_{Vi}$ corresponding to the different working voltages of the chip at some temperature is acquired by calculation according to the first and second actual output values of the HPM when the chip works with the different working voltages at some temperature, the acquired reference value $R_{rcc}$, and the formula $S=(X1\times\alpha+X2\times\beta)-R_{rcc}$. After $S_{Vmin}$ that is equal to zero or closest to zero is acquired from $S_{Vi}$, the minimum working voltage of the chip is determined according to a group of actual output values of the HPM to which $S_{Vi}$ corresponds. For example, when the chip works at 40° C., and when the working voltages of the chip are V1=0.75 V, V2=0.76 V, V3=0.77 V, respectively, the actual output values of the HPM are $X1_{V1}=0.1$, $X2_{V1}=0.2$; $X1_{V2}=0.3$, $X2_{V2}=0$ 0.4; $X1_{V3}=0.5$, $X2_{V3}=0.6$, respectively; and $S_{V1}=-0.2$, $S_{V2}=0$, and $S_{V3}=0.2$ are separately calculated according to the acquired reference value $R_{rcc}=0.4$, $\alpha=0$, $\beta=1$, and the formula $S=(X1\times\alpha+X2\times\beta)-R_{rcc}$. It may be known that $S_{V2}=0$, that is, when $\alpha=0$ and $\beta=1$, the required minimum working voltage of the chip at 40° C. may be $V_{min}=V2=0.76$ V.

Likewise, according to the actual output values of the HPM when the chip works with the different working voltages at other temperatures, the required minimum working voltage of the chip at all temperatures when $\alpha=0$ and $\beta=1$ may be acquired, and a curve of first possible relationship between the required minimum working voltage of the chip and the temperature when $\alpha=0$ and $\beta=1$ may also be acquired.

After the curve of first possible relationship between the required minimum working voltage of the chip and the temperature when $\alpha=0$ and $\beta=1$ is acquired, a second group of values are assigned to the first weight $\alpha$ and the second weight $\beta$, and according to the foregoing steps, a curve of second possible relationship between the required minimum working voltage of the chip and the temperature when the second group of values are assigned to the first weight $\alpha$ and the second weight $\beta$ is acquired. By analogy, all curves of possible relationship between the required minimum working voltage of the chip and the temperature when all groups of values are assigned to the first weight $\alpha$ and the second weight $\beta$ are acquired. Assigning values to the first weight $\alpha$ and the second weight $\beta$ has to meet one condition that the sum of the first weight $\alpha$ and the second weight $\beta$ is 1. In this embodiment, a new group of values are assigned to the first weight $\alpha$ and the second weight $\beta$ with a difference of 0.1 each time within a range from 0 to 1. For example, ten groups of values are assigned respectively to the first weight $\alpha$ and the second weight $\beta$ in the following manner: $\alpha=0$, $\beta=1$; $\alpha=0.1$, $\beta=0.9$; $\alpha=0.2$, $\beta=0.8$; ... $\alpha=1$, $\beta=0$; and curves of possible relationships between the required minimum working voltage of the chip and the temperature when the ten groups of values are assigned to the first weight $\alpha$ and the second weight $\beta$ are acquired, respectively. It may be understood that the new group of values are not necessarily assigned to the first weight $\alpha$ and the second weight $\beta$ with the difference of 0.1 each time within the range of 0 to 1. In another embodiment, values may be assigned to the first weight $\alpha$ and the second weight $\beta$ with a bigger or smaller value difference each time within the range of 0 to 1, which is not limited herein.

Finally, vector distances from the curve of the actual relationship between the required minimum working voltage of the chip and the temperature to each curve of possible relationship between the required minimum working voltage of the chip and the temperature are calculated respectively, and a curve of possible relationship between the required minimum working voltage of the chip and the temperature that has a shortest distance to the curve of the actual relationship between the required minimum working voltage of the chip and the temperature is acquired, and the values of the first weight $\alpha$ and the second weight $\beta$ to which the curve of the possible relationship corresponds is acquired. For example, a curve of possible relationship between the required minimum working voltage of the chip and the temperature that is acquired when $\alpha=0.1$ and $\beta=0.9$ has the shortest distance to the curve of actual relationship between the required minimum working voltage of the chip and the temperature; that is, the first weight $\alpha=0.1$ and the second weight $\beta=0.9$ are acquired.

It should be noted that the first weight and the second weight are not necessarily determined by means of the least square method. In another embodiment, any manner that determines the first weight and the second weight and enables the fitting output value of the HPM to correctly reflect the current performance information of the critical paths in the chip may be used, which is not limited herein. Optionally, for an HPM that includes more than two delay circuits, similar to the least square method, according to the minimum working voltages of the chip at the different temperatures as well as actual output values of the more than two delay circuits in the HPM when the chip works with the different working voltages at the different temperatures, the multi-dimensional least square method may be adopted for the AVS module in the present application to determine the first weight and the second weight. In addition, determining the first weight and the second weight may be performed by the chip, any apparatus in which the least square method may be adopted to determine the first weight and the second weight, or technical personnel, which is not limited herein.

Step 904: The AVS module determines whether a difference acquired by subtracting the predetermined reference value from the fitting output value of the HPM is larger than zero or smaller than zero.

After acquiring the fitting output value of the HPM, the AVS module acquires a difference S acquired by subtracting a reset reference value $R_{rcc}$ from the fitting output value of the HPM according to the formula $S=X_{fitting}-R_{rcc}$ and determines whether S is larger than zero or smaller than zero. If S is larger than zero, step 905 is performed; and if S is smaller than zero, step 906 is performed. The reference value $R_{rcc}$ is a fitting output value of the HPM to ensure that the chip works with the minimum working voltage at any temperature.

Furthermore, before step 904 is performed, the AVS module acquires from, data tested by an Automatic Test Equipment, the first and second actual output values of the HPM when the chip works with the minimum working voltage at any temperature and fits the first and second actual output values of the HPM respectively according to the predetermined first and second weights to acquire the reference value $R_{rcc}$ and save the reference value $R_{rcc}$ in the AVS module.

Step 905: The AVS module determines that the current working voltage of the chip is larger than the current required working voltage and decreases the working voltage of the chip.

When the difference S acquired by subtracting the predetermined reference value $R_{rcc}$ from the fitting output value of the HPM is larger than zero, the current working voltage of the chip is higher than the required minimum working voltage, and therefore the working voltage is decreased. In this embodiment, the AVS module controls an external power module to output a working voltage that is 10 mV lower than the original working voltage and then performs the foregoing step S901 to step S904. If S is still larger than zero, the AVS module controls the external power module to output a working voltage that is 10 mV lower than the previous working voltage until S is zero or begins to be smaller than zero and increases the current working voltage by 10 mV. Certainly, in another embodiment, a voltage difference that is larger than or smaller than 10 mV is adopted as a voltage parameter for the working voltage of the chip to decrease each time, which is not limited herein.

Step S906: The AVS module determines that the current working voltage of the chip is smaller than the current required working voltage and increases the working voltage of the chip.

When the difference S acquired by subtracting the predetermined reference value $R_{rcc}$ from the fitting output value of the HPM is smaller than zero, it indicates that the current working voltage of the chip is lower than the required minimum working voltage, and therefore the working voltage is increased. In this embodiment, the AVS module controls the external power module to output a working voltage that is 10 mV higher than the original working voltage and then performs the foregoing step S901 to step S904. If S is still smaller than zero, the AVS module controls the external power module to output a working voltage that is 10 mV higher than the previous working voltage until S is zero or begins to be larger than zero. Certainly, in another embodiment, a voltage difference that is larger than or smaller than 10 mV is adopted as a voltage parameter for the working voltage of the chip to increase each time, which is not limited herein.

In a further optimal way, the AVS module determines whether the difference acquired by subtracting the reference value from the fitting output value of the HPM is larger than zero or smaller than zero and determines whether the difference acquired by subtracting the reference value from the fitting output value of the HPM is larger than a predetermined threshold or not. If the difference acquired by subtracting the reference value from the fitting output value is larger than zero and larger than the predetermined threshold, the AVS module decreases the working voltage of the chip. If the difference acquired by subtracting the reference value from the fitting output value is smaller than zero yet larger than the predetermined threshold, the AVS module increases the working voltage of the chip. If the difference acquired by subtracting the reference value from the fitting output value of the HPM is smaller than the predetermined threshold, it is believed that the current working voltage of the chip is very close to the minimum working voltage and there is no need to regulate the current working voltage of the chip. The predetermined threshold may be configured as a different value according to a practical application, which is not limited herein.

Nevertheless, the AVS module does not necessarily regulate the working voltage of the chip by controlling the external power module. In another embodiment where the chip includes a power module, the AVS module regulates the working voltage of the chip by controlling the power module in the chip, which is not limited herein.

The present application further provides an embodiment of an HPM, and the HPM at least includes a first delay circuit and a second delay circuit. The first delay circuit includes at least one first delay unit of a first Vt type and a first encoding unit; an output terminal and an input terminal of the at least one first delay unit are head-to-tail connected to form a loop; the first encoding unit performs encoding according to an output value of the at least first delay unit, to acquire a first actual output value that can reflect a delay situation of the first delay units and further reflect current performance information of the first Vt type. The second delay circuit includes at least one second delay unit of a second Vt type and a second encoding unit; an output terminal and an input terminal of the at least one second delay unit are head-to-tail connected to form a loop; the second encoding unit performs encoding according to an output value of the at least one second delay unit, to acquire a second actual output value that can reflect a delay situation of the second delay unit and further reflect current performance information of the second Vt type.

The first Vt type and the second Vt type are Vt types which change at different speeds with temperature. For the detailed description of the HPM, refer to FIGS. 4 to 7 and written descriptions in the related embodiments of the chip of the present application. Details are not described herein again.

By means of the foregoing solutions, the present application sets at least two types of delay circuits in an HPM, and for the two types of the delay circuits, a delay unit of a Vt type that changes fastest with temperature and a delay unit of a Vt type that changes slowest with the temperature are respectively adopted, to fit an actual output value of the HPM and acquire a fitting output value of the HPM that can accurately reflect current performance information of critical paths of a chip and further properly regulate a working voltage of the chip, thereby effectively reducing power consumption of the chip on a premise that the chip works normally.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A voltage regulation method for regulating a working voltage of a chip, wherein the chip comprises an adaptive voltage scaling AVS module and at least one hardware performance monitor HPM, and the method comprises:
   outputting, by the AVS module, a clock signal to the HPM;
   generating, by the HPM, a corresponding pulse signal according to the clock signal, and at least performing, for the pulse signal, first delaying related to a first threshold voltage Vt type that is in the chip and changes fastest with temperature, to acquire a first actual output value that can reflect current performance information of the first Vt type, performing, for the pulse signal, second delaying related to a second Vt type that is in the chip and changes slowest with the temperature, to acquire a second actual output value that can reflect current performance information of the second Vt type, and outputting the first and second actual output values to the AVS module; and
   fitting, by the AVS module, the first and second actual output values at least according to weights of the first and second actual output values, and acquiring a fitting output value that can reflect current performance information of critical paths, and determining whether to regulate the working voltage of the chip by comparing the fitting output value with a predetermined reference value, wherein the predetermined reference value is a fitting output value of the HPM when the chip works with a minimum working voltage at any temperature.

2. The method according to claim 1, wherein the fitting, by the AVS module, the first and second actual output values at least according to weights of the first and second actual output values, and acquiring a fitting output value that can reflect current performance information of critical paths in the chip comprises:
   calculating, by the AVS module, a first product acquired by multiplying the first actual output value of the HPM by a predetermined first weight, and calculating a second product acquired by multiplying the second actual output value of the HPM by a predetermined second weight, to acquire a sum of the first product and the second product and use the sum as the fitting output value of the HPM.

3. The method according to claim 2, before the outputting, by the AVS module, a clock signal to the HPM, comprising:
   acquiring the minimum working voltage of the chip at different temperatures, and the first and second actual output values of the HPM when the chip works with different working voltages at the different temperatures; and
   adopting the least square method to perform calculation on the minimum working voltage of the chip at the different temperatures and the first and second actual output values of the HPM when the chip works with the different working voltages at the different temperatures, to acquire the predetermined first weight and the predetermined second weight.

4. The method according to claim 1, wherein a step of the determining whether to regulate the working voltage of the chip by comparing the fitting output value with a predetermined reference value comprises:
   determining, by the AVS module, whether a difference acquired by subtracting the predetermined reference value from the fitting output value is larger than zero or smaller than zero; and
   if the difference is larger than zero, determining that a current working voltage of the chip is higher than the minimum working voltage required at the moment and decreasing the working voltage of the chip;
   and if the difference is smaller than zero, determining that the current working voltage of the chip is lower than the minimum working voltage required at the moment and increasing the working voltage of the chip.

5. A hardware performance monitor, at least comprising a first delay circuit and a second delay circuit, wherein:
   the first delay circuit comprises at least one first delay unit of a first threshold voltage Vt type and a first encoding unit; wherein: an output terminal and an input terminal of the at least one first delay unit are head-to-tail connected to form a loop; and the first encoding unit performs encoding according to an output value of the at least one first delay unit, to acquire a first actual output value that can reflect a delay situation of the at least one first delay unit and further reflecting current performance information of the first Vt type;
   the second delay circuit comprises at least one second delay unit of a second Vt type and a second encoding unit; wherein: an output terminal and an input terminal of the at least one second delay unit are head-to-tail connected to form a loop; and the second encoding unit performs encoding according to an output value of the at least one second delay unit, to acquire a second actual output value that can reflect a delay situation of the at least one second delay unit and further reflecting current performance information of the second Vt type; and
   the first Vt type and the second Vt type are Vt types that change at different speeds with temperature.

6. A chip, comprising: an adaptive voltage scaling AVS module and at least one hardware performance monitor HPM; wherein: the AVS module is coupled to the at least one HPM;
   the AVS module comprises an outputting unit, a fitting unit, and a regulating unit, wherein the outputting unit is configured to output a clock signal to the HPM;
   the HPM at least comprises: a generating module, a first delay circuit, and a second delay circuit; wherein: the generating module is configured to generate a corresponding pulse signal according to the clock signal; the first delay circuit is configured to perform, for the pulse signal, first delaying related to a first threshold voltage Vt type that is in the chip and changes fastest with temperature, to acquire a first actual output value that can reflect current performance information of the first Vt type; the second delay circuit is configured to perform, for the pulse signal, second delaying related to a second Vt type that is in the chip and changes slowest with temperature, to acquire a second actual output value that can reflect current performance information of the second Vt type; and the HPM outputs the first and second actual output values to the fitting unit of the AVS module;

the fitting unit of the AVS module is configured to fit the first and second actual output values at least according to weights of the first and second actual output values to acquire a fitting output value that can reflect current performance information of critical paths in the chip; and the regulating unit is configured to determine, by comparing the fitting output value with a predetermined reference value, whether to regulate a working voltage of the chip, wherein the predetermined reference value is a fitting output value of the HPM when the chip works with a minimum working voltage at any temperature.

7. The chip according to claim 6, wherein the fitting unit is specifically configured to calculate a first product acquired by multiplying the first actual output value of the HPM by a predetermined first weight and calculate a second product acquired by multiplying the second actual output value of the HPM by a predetermined second weight, to acquire a sum of the first product and the second product and use the sum as the fitting output value of the HPM.

8. The chip according to claim 7, wherein:

the predetermined first weight and the predetermined second weight are acquired specifically by firstly acquiring the minimum working voltage of the chip at different temperatures and the first and second actual output values of the HPM when the chip works with different working voltages at different temperatures, and then adopting the least square method to perform calculation on the minimum working voltage of the chip at the different temperatures and the first and second actual output values of the HPM when the chip works with the different working voltages at the different temperatures.

9. The chip according to claim 6, wherein the regulating unit is specifically configured to: determine whether a difference acquired by subtracting the predetermined reference value from the fitting output value is larger than zero or smaller than zero; if the difference is larger than zero, determine that a current working voltage of the chip is higher than the minimum working voltage required at the moment and decrease the working voltage of the chip; and if the difference is smaller than zero, determine that the current working voltage of the chip is lower than the minimum working voltage required at the moment and increase the working voltage of the chip.

10. The chip according to claim 6, wherein: the first delay circuit comprises at least one first delay unit of the first Vt type and a first encoding unit, wherein an output terminal and an input terminal of the at least one first delay unit are head-to-tail connected to form a loop, and the first encoding unit performs encoding according to an output value of the at least one first delay unit, to acquire a first actual output value that can reflect a delay situation of the first delay unit and further reflecting current performance information of the first Vt type; and the second delay circuit comprises at least one second delay unit of the second Vt type and a second encoding unit, wherein an output terminal and an input terminal of the at least one second delay unit are head-to-tail connected to form a loop, and the second encoding unit performs encoding according to an output value of the at least one second delay unit, to acquire a second actual output value that can reflect a delay situation of the second delay unit and further reflecting current performance information of the second Vt type.

11. The chip according to claim 10, wherein the HPM further comprises a third delay circuit, wherein the third delay circuit comprises at least one third delay unit of a third Vt type and a third encoding unit; wherein an output terminal and an input terminal of the at least one third delay unit are head-to-tail connected to form a loop; the third encoding unit performs encoding according to an output value of the at least one third delay unit, to acquire a third actual output value that can reflect a delay situation of the third delay unit and further reflecting current performance information of the third Vt type, wherein the third Vt type is a Vt type that is in the chip and changes between fastest and lowest with temperature; and the fitting unit of the AVS module is specifically configured to fit the first, second, and third actual output values according to weights of the first, second, and third actual output values to acquire a fitting output value that can reflect current performance information of the critical paths in the chip.

12. A chip system, wherein the chip system comprises a chip and a power chip;

wherein the chip comprising: an adaptive voltage scaling AVS module and at least one hardware performance monitor HPM; wherein: the AVS module is coupled to the at least one HPM; the AVS module comprises an outputting unit, a fitting unit, and a regulating unit, wherein the outputting unit is configured to output a clock signal to the HPM; the HPM at least comprises: a generating module, a first delay circuit, and a second delay circuit; wherein: the generating module is configured to generate a corresponding pulse signal according to the clock signal; the first delay circuit is configured to perform, for the pulse signal, first delaying related to a first threshold voltage Vt type that is in the chip and changes fastest with temperature, to acquire a first actual output value that can reflect current performance information of the first Vt type; the second delay circuit is configured to perform, for the pulse signal, second delaying related to a second Vt type that is in the chip and changes slowest with temperature, to acquire a second actual output value that can reflect current performance information of the second Vt type; and the HPM outputs the first and second actual output values to the fitting unit of the AVS module; the fitting unit of the AVS module is configured to fit the first and second actual output values at least according to weights of the first and second actual output values to acquire a fitting output value that can reflect current performance information of critical paths in the chip; and the regulating unit is configured to determine, by comparing the fitting output value with a predetermined reference value, whether to regulate a working voltage of the chip, wherein the predetermined reference value is a fitting output value of the HPM when the chip works with a minimum working voltage at any temperature;

wherein the power chip is configured to supply power for the chip, and when it is determined that a working voltage of the chip needs to be increased, an AVS module of the chip instructs the power chip to input to the chip a working voltage that is a predetermined value higher than an original working voltage; and when it is determined that the working voltage of the chip needs to be decreased, the AVS module of the chip instructs the power chip to input to the chip a working voltage that is a predetermined value lower than the original working voltage.

13. The chip system according to claim 12, wherein the fitting unit is specifically configured to calculate a first product acquired by multiplying the first actual output value of the HPM by a predetermined first weight and calculate a second product acquired by multiplying the second actual output value of the HPM by a predetermined second weight, to acquire a sum of the first product and the second product and use the sum as the fitting output value of the HPM.

14. The chip system according to claim 13, wherein:
the predetermined first weight and the predetermined second weight are acquired specifically by firstly acquiring the minimum working voltage of the chip at different temperatures and the first and second actual output values of the HPM when the chip works with different working voltages at different temperatures, and then adopting the least square method to perform calculation on the minimum working voltage of the chip at the different temperatures and the first and second actual output values of the HPM when the chip works with the different working voltages at the different temperatures.

15. The chip system according to claim 12, wherein the regulating unit is specifically configured to: determine whether a difference acquired by subtracting the predetermined reference value from the fitting output value is larger than zero or smaller than zero; if the difference is larger than zero, determine that a current working voltage of the chip is higher than the minimum working voltage required at the moment and decrease the working voltage of the chip; and if the difference is smaller than zero, determine that the current working voltage of the chip is lower than the minimum working voltage required at the moment and increase the working voltage of the chip.

16. The chip system according to claim 12, wherein: the first delay circuit comprises at least one first delay unit of the first Vt type and a first encoding unit, wherein an output terminal and an input terminal of the at least one first delay unit are head-to-tail connected to form a loop, and the first encoding unit performs encoding according to an output value of the at least one first delay unit, to acquire a first actual output value that can reflect a delay situation of the first delay unit and further reflecting current performance information of the first Vt type; and the second delay circuit comprises at least one second delay unit of the second Vt type and a second encoding unit, wherein an output terminal and an input terminal of the at least one second delay unit are head-to-tail connected to form a loop, and the second encoding unit performs encoding according to an output value of the at least one second delay unit, to acquire a second actual output value that can reflect a delay situation of the second delay unit and further reflecting current performance information of the second Vt type.

17. The chip according to claim 16, wherein the HPM further comprises a third delay circuit, wherein the third delay circuit comprises at least one third delay unit of a third Vt type and a third encoding unit; wherein an output terminal and an input terminal of the at least one third delay unit are head-to-tail connected to form a loop; the third encoding unit performs encoding according to an output value of the at least one third delay unit, to acquire a third actual output value that can reflect a delay situation of the third delay unit and further reflecting current performance information of the third Vt type, wherein the third Vt type is a Vt type that is in the chip and changes between fastest and lowest with temperature; and
the fitting unit of the AVS module is specifically configured to fit the first, second, and third actual output values according to weights of the first, second, and third actual output values to acquire a fitting output value that can reflect current performance information of the critical paths in the chip.

* * * * *